United States Patent
Park et al.

(10) Patent No.: US 9,658,738 B1
(45) Date of Patent: May 23, 2017

(54) REPRESENTATION MANAGEMENT ON AN ELECTRONIC DEVICE

(71) Applicant: Amazon Technologies, Inc., Reno, NV (US)

(72) Inventors: Chul Sung Park, Mountain View, CA (US); Aleksandar Pance, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 13/689,225

(22) Filed: Nov. 29, 2012

(51) Int. Cl.
*G06F 3/00* (2006.01)
*G06F 3/0481* (2013.01)
*G06F 17/30* (2006.01)

(52) U.S. Cl.
CPC .... *G06F 3/04817* (2013.01); *G06F 17/30964* (2013.01)

(58) Field of Classification Search
CPC ..................................................... G06F 3/0481
USPC ................. 715/765, 810, 823, 864; 707/706
See application file for complete search history.

(56) References Cited

U.S. PATENT DOCUMENTS

| | | | |
|---|---|---|---|
| 2006/0112354 A1* | 5/2006 | Park | G06F 3/0481 715/835 |
| 2010/0017505 A1* | 1/2010 | Kamada et al. | 709/221 |
| 2011/0072492 A1* | 3/2011 | Mohler et al. | 715/765 |
| 2012/0117499 A1* | 5/2012 | Mori et al. | 715/765 |
| 2012/0131470 A1* | 5/2012 | Wessling et al. | 715/739 |
| 2012/0297342 A1* | 11/2012 | Jang et al. | 715/823 |
| 2013/0166527 A1* | 6/2013 | Kasterstein et al. | 707/706 |
| 2013/0246323 A1* | 9/2013 | Athas et al. | 706/46 |

* cited by examiner

*Primary Examiner* — Haoshian Shih
(74) *Attorney, Agent, or Firm* — Lee & Hayes, PLLC

(57) ABSTRACT

In some examples, a device presents a plurality of icons of items, such as applications, content items, etc., in a user interface. When determining how to present the icons, the device may refer to an access history that identifies which items of a plurality of items have been accessed on the device. One or more of the icons may be presented in a designated area of the interface based at least in part on a frequency with which the items corresponding to the one or more icons have been accessed on the device. In addition, the one or more icons may be selected for presentation in the designated area based at least in part on a current context of the device, which may include at least one of a current time, a current location of the device, or a current activity of a user of the device.

27 Claims, 11 Drawing Sheets

REPRESENTATION MANAGEMENT ON AN ELECTRONIC DEVICE

BACKGROUND

People use electronic devices for a variety of purposes, such as making telephone calls, texting, accessing the Internet, sending and receiving email, viewing movies and television shows, playing music, reading electronic books, socializing, playing games, navigation, and numerous other functions. Users of these devices often download a large number of applications, utilities and other programs to use on these devices for various functions. Further, because some of these devices may have a touch interface, the graphical representations or icons that represent these programs are commonly large enough for users to touch easily to a select a particular icon. However, since these devices also may have displays with small form factors, only a limited number of icons can be presented on the display at any one time. Consequently, users frequently end up scrolling through a number of pages of icons to locate a desired icon. Further, when there are a large number of icons, it can be difficult to locate a particular icon, even on larger displays.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
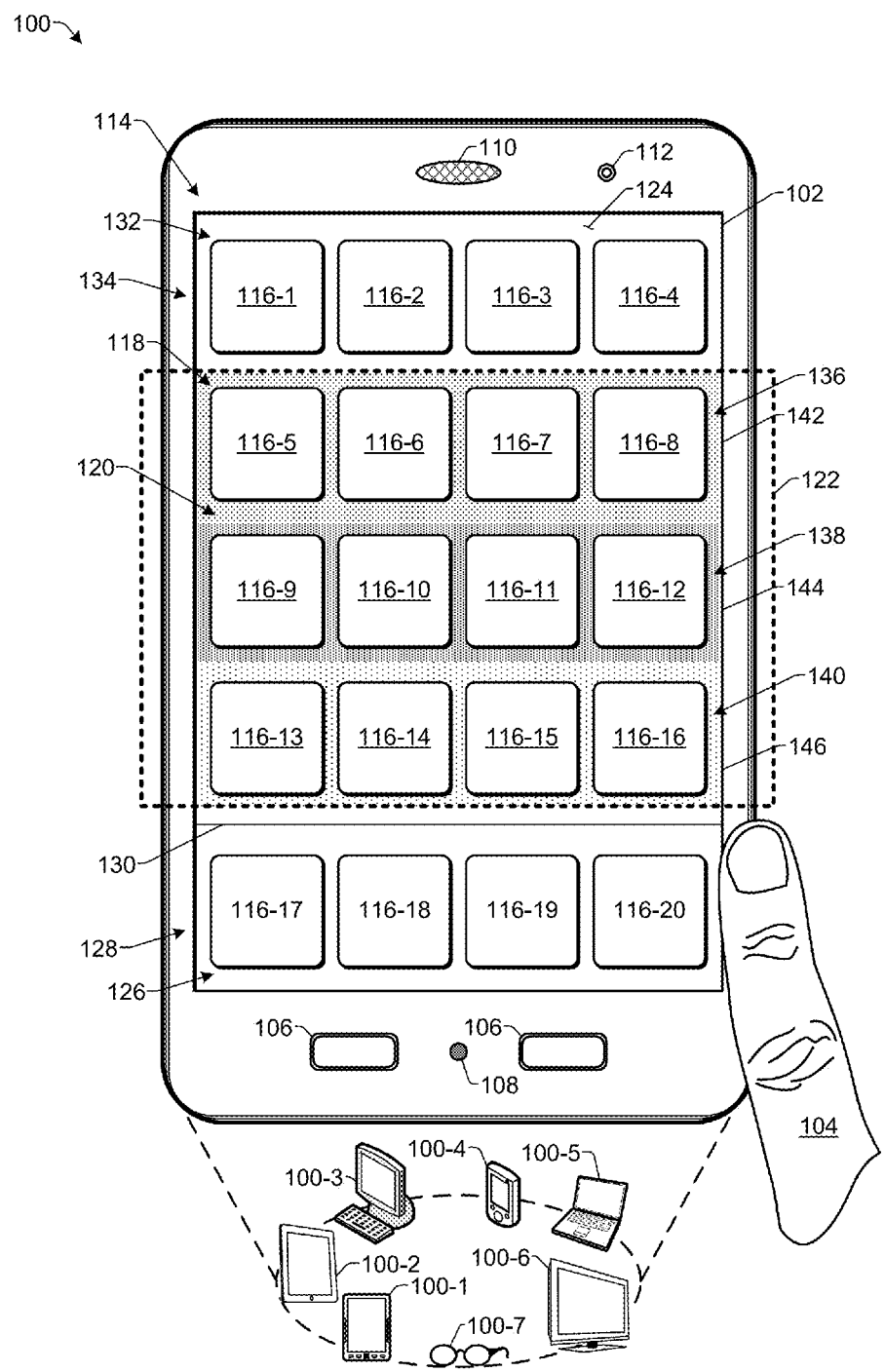
FIG. 1 illustrates an example electronic device having an interface with icon management according to some implementations.

Some implementations herein include techniques and arrangements for managing graphical representations or icons in a user interface on an electronic device. Some implementations also include techniques for managing and recommending applications and content items on an electronic device. For instance, the electronic device may determine a current context of the electronic device and/or a user of the electronic device. Based at least in part on the current context, the electronic device may determine one or more applications or content items to surface to the user of the electronic device. For example, the electronic device may rearrange a plurality of icons in a user interface of the electronic device to prominently present one or more icons based on information indicating the current context of the device. The icons may be graphical elements, logos, shortcuts or other graphical representations of applications, content items, or the like, that are accessible on the electronic device by selection of a respective icon via the user interface. In some examples, the device may further search a network-accessible catalog based on the current context to recommend one or more applications or content items that are relevant to the current context.

People usually have many items, such as applications (which may include utilities, computer programs, or other types of executable computer code), content items, and so forth, installed in their electronic devices. Generally, however, only a small number of these items are used frequently. Furthermore, because icons of applications and other items are commonly placed in the user interface in the order in which they are downloaded or installed, the icons of some frequently used items may be at the last page or at random locations among a large number of icons. Accordingly, in some implementations herein, the electronic device monitors and analyzes how a user uses an application or other item to learn how often each these items is used over a period of time. Thus, the electronic device may determine which items are used more frequently in various contexts. For example, the electronic device may monitor the usage of items at different physical locations (e.g., indoor or outdoor, at home, in an office, at school, at the grocery store, at a shopping mall, at a museum, at a sporting event, and so forth). The electronic device may further determine which items are used more frequently at different times of day and on different days of the week, such as whether the item is commonly used on weekdays or on the weekend, whether used in the morning, the afternoon, or in the evening, etc. Based on the determinations, the device may present icons of certain items more prominently, such as in a designated area of the interface, based on a current context detected by the device.

The electronic device may manage the location of the icons in the user interface based on a set of rules, which may be set by default and/or which may be set by a user. For example, icons of more frequently used items may be moved by the device to an area on a home page or first page of the user interface. For instance, the first page may include an area designated for displaying icons that are identified by the electronic device as being related to a current context detected by the electronic device. As one example, the electronic device may move the icons to a designated area on the first page or to a designated area in a designated directory on the first page. The movement of different icons in and out of the designated area on the first page may be triggered by various context indicators, such as a user's location, a predicted current activity of the user, a current time and/or day, or the like. As another example, the user may be able to override the automatic management of the icons. For example, the user may make a user input or issue a voice command such as "show game apps," which may result in one or more game-related icons being moved into the first page of the user interface.

In addition, the electronic device may manage the applications and content items maintained on the device based on an overall frequency of usage or lack of usage, and may designate a particular item for uninstallation if the item has not been used during a threshold period of time. For example, if an application has never been used, or has not been used within the past several months, six months, year, etc., the electronic device may designate this application for uninstallation, such as by moving the icon of the application to a predetermined area such as to a particular directory or other designated area in the user interface. The user of the device may be periodically prompted to confirm that these items can be deleted from the electronic device. In other examples, the electronic device may automatically delete these items from the electronic device based on a user setting or a user preference to perform such action when the threshold period of time has expired.

Furthermore, in some examples, the electronic device may make or may receive recommendations of applications for the user to acquire, such as from an online store, network-accessible catalog, or the like. For example, based on the context information, the electronic device may search the network-accessible catalog for one or more suitable applications or content items corresponding to the current context of the device. For example, suppose that the electronic device detects that the user has arrived in a new city in which the device has not previously been. The electronic device may search the network-accessible catalog for a suitable application or content item, such as a navigation application, a map of the city, a map of a metro system for the city, and so forth.

Additionally, as another example, the electronic device may employ cloud processing to determine the current context and/or to determine recommendations for the current context. For example, the electronic device may provide context-indicative information to a remote computing device, which may take into consideration additional information, such as current weather conditions at a physical location of the electronic device, current news relevant to the location, aggregated user information, such as what other users downloaded at a location or during a detected activity, or other information that is not readily detectable by the electronic device, when determining a recommendation for the electronic device. In some cases, the remote computing device may access network accessible resources when determining the recommendation. For instance, the network accessible resources may include social networking information or network-accessible catalog information that may be helpful when making a recommendation. As one example, the computing device may determine applications downloaded by friends of the user at a particular location or in a particular context that corresponds to the user's current context.

For discussion purposes, some example implementations are described in the environment of application and icon management, such as in response to a detected user context. However, the implementations herein are not limited to the particular examples provided, and may be extended to other types of interface configurations, other types of icons, and other types of items, as will be apparent to those of skill in the art in light of the disclosure herein.

FIG. 1 illustrates an example electronic device 100 able to present an interface with icon management according to some implementations. The electronic device 100 may be implemented as any of a number of different types of electronic devices. Some examples of the electronic device 100 may include digital media devices and electronic book (eBook) readers 100-1; tablet computing devices 100-2; desktop, terminal and workstation computing devices 100-3; smart phones and mobile devices 100-4; laptop and netbook computing devices 100-5; televisions, gaming systems, home electronic devices, and automotive electronic devices 100-6; augmented reality devices, helmets, goggles or glasses 100-7; and any other device capable of executing applications, capable of presenting content items or online content, or capable of displaying icons, managing the icons, and managing the corresponding items according to the techniques described herein.

The electronic device 100 may include, or may have associated therewith, a display 102 to present information to a user. In some types of electronic devices 100, the display 102 may be a touch-sensitive display configured with a touch sensor to sense a touch input received from an input effecter 104, such as a finger of a user, a stylus, or the like. Thus, the touch-sensitive display may receive one or more touch inputs, stylus inputs, selections of icons, selections of text, selections of interface components, and so forth.

In other implementations, the display 102 may be non-touch sensitive. Accordingly, in addition to, or as an alternative to, a touch sensitive display, the electronic device 100 may include various external controls, buttons, or input devices 106. For example, some implementations (not shown in FIG. 1) of the electronic device 100 may include a virtual or physical keyboard or keypad, a mouse, a pointing stick, a touchpad, a trackball, a joystick, a remote control, and/or various other controls for performing various desired inputs and interactions with the electronic device 100, such as with an interface 104 or other information presented on the display 102. Additionally, in some implementations, one or more voice commands may be used to control or interact with the interfaces and electronic devices herein. Further, in some examples, a user's eye position or point of focus may be detected to serve as inputs or commands. Thus, implementations herein are not limited to any type of input devices, techniques, or controls. In this example, the electronic device 100 includes various other components, such as one or more microphones 108, one or more speakers 110, and one or more cameras 112.

In the illustrated example, the display 102 may present a user interface 114 that includes a plurality of icons or icons 116. For example, each icon 116 may represent an application, a content item, or other item accessible on the electronic device 100. Applications may include downloaded applications, preinstalled applications, utilities, accessories, tools, operating system features, or any other computer program, software, or executable code that may be accessed or executed on the electronic device 100, such as to perform a particular function.

Further, in some cases, the content items may include electronic books (eBooks), and/or electronic versions of magazines, newspapers, periodicals, journals, reference materials, textbooks, anthologies, instruction manuals, proceedings of meetings, forms, directories, personal documents, web pages, plays, screen plays, closed captioning transcripts of movies and television shows, song lyrics, and so forth. The content items may further include multimedia content items, such as music, songs, audio books, audio recordings, video recordings, movies, television shows, games, and the like. In some cases, the applications and the content items may be referred herein to as items, and each icon 116 displayed in the user interface may represent a selectable or otherwise accessible item.

In some examples, one or more modules of an operating system of the electronic device 100 may generate the interface 114 and may manage the icons 116 and the associated items. In other examples, the interface 114 may be presented by an application or other module that is separate from the operating system. As several examples, the interface 114 and any associated graphic effects, may be generated using any of HTML (hypertext markup language), JavaScript®, CSS (Cascading Style Sheets), widgets, C, C+, Java®, any combination thereof, or any other suitable technology, programming language, or graphics rendering software.

The interface 114 may present a plurality of the icons or icons 116 on the display 102. According to the implementations herein, the device 100 may automatically rearrange some or all of the plurality of icons 116 based on various considerations. As one example, the icons 116 may be rearranged automatically based on a frequency with which a user has accessed the corresponding items. Accordingly, the icons 116 presented on the first page of the interface 114 may correspond to those items that the user has accessed most frequently and the icons 116 may be arranged in a descending order of frequency such that the icons 116 presented on a last page of the interface 114 may represent those items that have been accessed very infrequently or not at all. Additionally, or alternatively, a duration of time over which the items are accessed may be taken into consideration when arranging the icons 116. For example, a particular icon 116 may be presented in a designated area based at least in part on how long a user spends using a corresponding item. In some cases both frequency of access and duration of access may be considered when arranging the icons 116.

In some situations, users may prefer to manage the locations of certain icons on their own while allowing the device 100 to manage the presentation of other icons. Accordingly, in the example of FIG. 1, a first group 118 of icons included in a first icon area 120 of the interface 114 indicated by a dashed line 122 includes icon 116-5 through 116-16. The icons in the first group 118 may be icons that are automatically reorganized and moved into or out of the area 120 based at least in part on considerations such as frequency of use, current detected context, user inputs, or the like.

In some cases, the example of FIG. 1 may represent a home page or first page 124 of the interface 114. For example, the first page 124 may be the first page presented to the user when the user turns on, activates, awakens, or logs in to the electronic device 100, or accesses the interface 114 of the electronic device 100, such as following closing of another interface, application, content item, or the like. The user may be able to scroll the pages of icons to view additional icons of items accessible on the electronic device 100. For example, the user may be able to scroll the pages up and down and/or left and right, depending on the configuration of the user interface 114, to view additional pages of icons that include icons that are different from the icons 116-1 through 116-16 that are presented in the first page 124. Additionally, in some cases, the example of FIG. 1 may be a page other than a first page of the interface 114.

Furthermore, a second group 126 of icons may be presented in a second area 128 of the user interface 114. The second group 126 of icons in this example includes icons 116-17 through 116-20, and these icons may continue to be presented regardless of the user scrolling from the first page 124 to additional pages of icons. For example, a divider 130 or other indicator may be presented in the interface 114 to indicate that the icons 116-17 through 116-20 below the divider 130 will remain displayed in the interface 114, while icons 116-1 through 116-16 above the divider 130 are part of the first page 124, which may be scrolled to present additional pages of icons.

In this example, the interface 114 includes a third group 132 of icons in a third area 134 of the interface 114. The third group 132 includes icons 116-1 through 116-4, which may be icons that the user does not wish to have removed from the first page 124. As one example, the user may control the size of the device-managed designated icon area 120 so that certain icons 116-1 through 116-4 are not included with the icons 116-5 through 116-16 that are movable in and out of the area 120 by the electronic device 100. For instance, the user may set the size of the first area 120 using various interface interaction techniques to include the entire page 124 or just a portion of the page 124. In some examples, a background, divider, or other indicator may indicate which icons 116 are included in the designated icon area 120 and which icons 116 are not. For example, the device-managed designated icon area 120 may be shaded or tinted a first color, or may have a particular background pattern, while the third area 134 may be a second, different color, pattern, etc. In some examples, the designated first area 120 may occupy the entire first page 124, while in other examples, the designated area 120 may be only a portion of the first page 124, as illustrated, while a remainder of the first page 124 may include the icons 116-1 through 116-4 that are managed manually by the user.

As one example, the icons 116-5 through 116-16 correspond to items that are accessed more frequently by the user than the other icons that are included on the other pages of icons in the user interface. In other examples, as discussed additionally below, an operating system of the device 100 may include one or more modules that run as background processes to monitor the current context of the device 100, such as by detecting whether the device is in motion, detecting where the device is physically located, detecting one or more applications currently executing on the device, or otherwise detecting a current use or context of the device, such as based on inputs received from one or more sensors, input devices, or other sources. When the electronic device 100 detects a change in context, the device may move one or more selected icons 116 corresponding to the new context into the designated device-managed icon area 120, while removing an equal number of one or more other icons from the designated area 120 to a location on a different page. For example, the device 100 may determine that the user is currently riding in a vehicle, and may move an icon 116 of a navigation application to the designated area 120. As another example, the device 100 may detect that the user is jogging, and may automatically move an icon of a fitness monitoring application and an icon of exercise-route-tracking application into the designated area 120.

Further, in some cases, the designated area 120 may present one or more applications recommended for downloading to the device 100 based on a currently determined context. For example, as discussed additionally below, upon determining a current context, the device 100 may access a network-accessible catalog, or the like, to locate one or more applications or other items relevant to the current context. For example, if the device determines from sensor information that the device is located at a theme park, the device may use the theme park name as a keyword when searching a catalog of an application store to recommend one or more applications for the theme park that the user may download to the device 100. Icons 116 of the recommended items may be presented in a portion of the designated area 120. For example, the user may select the icon to find out more about the recommended item.

In yet another variation, the designated area 120 may be divided into multiple designated areas that are each managed differently. For example, a first area or row 136 of icons 116 may be managed by the device based on a first characteristic, such as being used most frequently from among all items on the device. A second area or row 138 of icons 116 may be managed by the device based on another characteristic, such as being selected based on a currently detected context of the electronic device 100. A third area or row 140 of icons 116 may be managed by the device based on still another characteristic, such as being icons of applications or other items in a network-accessible catalog that are recommended for downloading to the device 100 based, at least in part, on a current context. Each different designated area or row 136, 138, 140 may have a visually distinguishing feature 142, 144, 146, respectively, to enable the area 136, 138, 140 to be visually distinguished from other areas 136, 138, 140, such as having a different colored background, a different background pattern, a different border, a different outline, label or so forth.

In addition, rather than having separate areas or rows 136, 138, 140 for each of the above-described characteristics, the interface 114 may include separate pages in the interface 114 that are designated for each of these characteristics. For example, the first page 124 may contain user-selected or user-managed icons. The user may swipe from the first page 124 to a second page that displays icons based on a first characteristic, such as most frequently used. The user may swipe to a third page that displays icons selected by the device 100 based on a different characteristic, such as a current context of the device 100. The user may swipe to a fourth page that displays icons based on a different characteristic, such as icons of recommended items from a network-accessible catalog. The user may swipe to a fifth page that displays icons based on a different characteristic, such as icons of items selected to be deleted, and so forth.

In some examples, the user may specify (or the device may default to) a specified organization or sorting arrangement of the icons to be presented in at least a portion of the designated area 120. For example, the icons may be sorted according to at least one of usage frequency, location or time. For instance, with respect to usage frequency, the user may be presented with different types of usage frequencies, such as items used daily, items used weekly, items that have not been used in three weeks, and so forth. For example, may cycle through different types of usage frequencies in the icon area 120, such as by using voice commands or other user inputs. Further, in some examples, these different types of usage may be represented by different pages, different directories, different designated areas, and so forth. As one example, the areas 136, 138, 140 may be designated by the user or by the device 100 for different respective types of usage frequencies.

Further, the icons may also, or alternatively, be sorted according to a location specified by the user, or according to a location determined by the device 100. For example, the user may set the device to display icons in the area 120 according to a location of the device 100, such as at home, at the office, on the road, at the gym, at a restaurant, at the airport, and so forth. In some cases, the device 100 may automatically determine the physical location of the device 100 and change the icons according to the determined physical location. In other examples, the user may specify a location for presentation of the icons. For example, the user may instruct the device to display icons of items used at the office. The device may then present those icons corresponding to items that the user uses most often at the office, even if the device 100 is not currently at the office. In some cases, the user may use voice commands or other user inputs to instruct the device 100 to present icons for a specified location. In other cases, after the user has specified that the icons should be sorted based on location, the device may automatically change the icons presented as the device determines that the device 100 has been moved to a new location.

In addition, the device may sort the icons according to time, such as morning, afternoon, evening, weekend, and so forth. For example, in the morning, the icons may be automatically arranged according to those items that the user uses most frequently in the mornings. Then, when afternoon arrives, the device may rearrange the icons to present icons of items that the user uses most frequently in the afternoon. In some cases, the user may instruct the device 100 to present the icons corresponding to items used most often in the morning, even if it is a different time of day.

In some examples, the user may issue a voice command or may make other user input to cause the sorting technique applied to the icons to change between any of usage frequency, location and/or time. For instance, the user may cycle through different sorting orders, such as by instructing the device to display icons based on usage frequency, based on location, based on time, etc. In other examples, the user may instruct the device to display icons based on location in area 136, usage frequency in area 138, time in area 140, and so forth. Further, different pages or different directories may be provided for different sorting techniques. Numerous other variations will be apparent to those of skill in the art in light of the disclosure herein.

Figure 2:
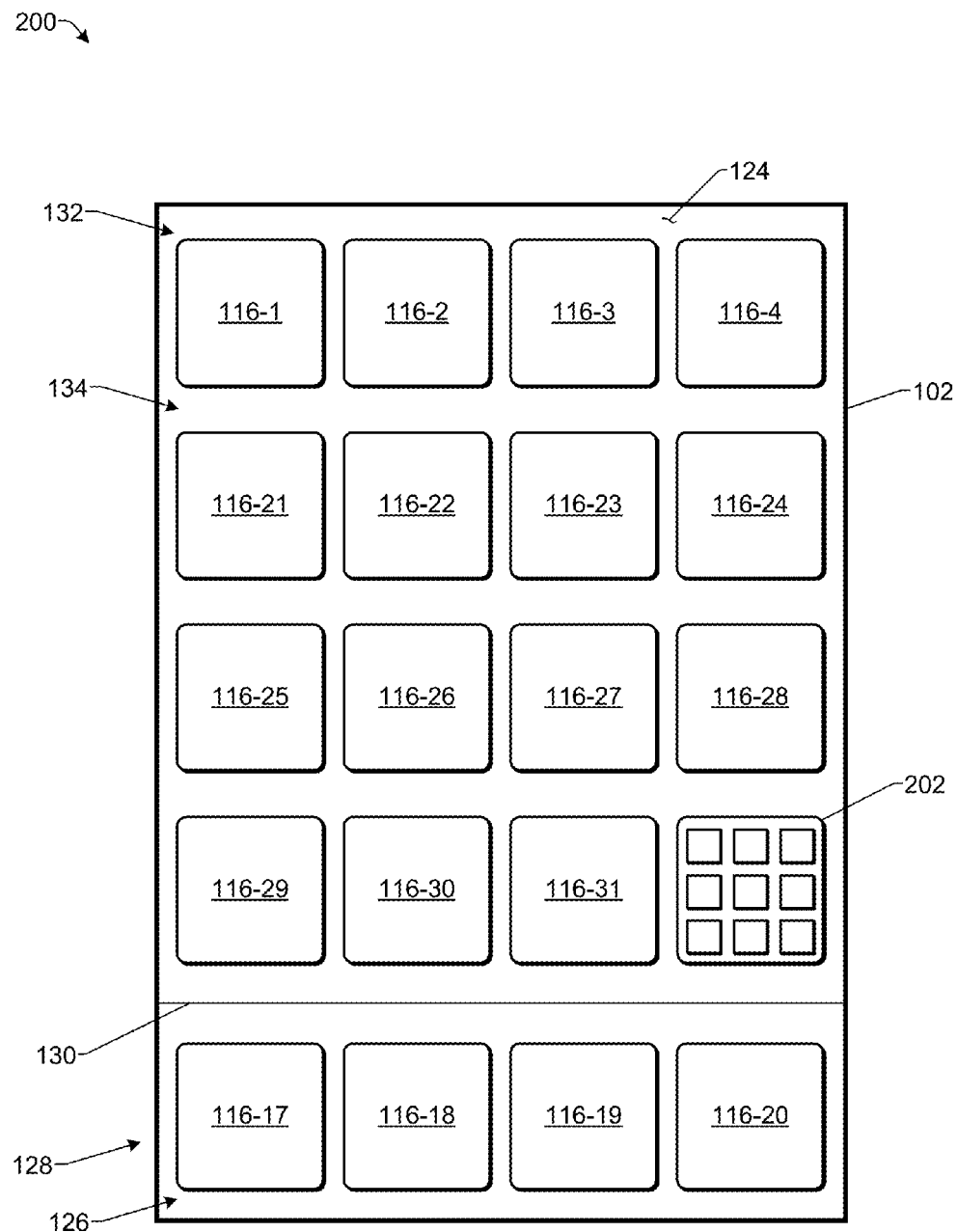
FIG. 2 illustrates an example interface with icon management according to some implementations.

FIG. 2 illustrates an example interface 200 with icon management according to some implementations. In this example, the interface 200 includes a directory representation 202 of a directory or folder. Accordingly, rather than presenting the icons 116-5 through 116-16 (not shown in FIG. 2) directly in the first page 124, the electronic device 100 may move the icons into a device-managed directory of icons, which is illustrated in FIG. 2 as a directory representation 202. For example, a directory representation 202 may represent a virtual folder or directory structure, such as a data structure, that is able to maintain icons that represent items accessible on the electronic device 100. For instance, the items themselves many not be organized into the particular directory structure, but at least the icons, which act as shortcuts for accessing the corresponding items, may be organized in the directory and viewable by opening or otherwise accessing the directory representation 202. Thus, the interface 200 may include a plurality of additional icons 116-21 through 116-31 that are included in the group 132, and the directory representation 202 may replace the device-managed icon area 120 in this example. For example, the user may select the directory representation 202 to view the icons 116 that the device 100 has selected as being related to the current context. Alternatively, or additionally, the directory 202 may contain icons 116 selected based on other characteristics, as discussed above.

Figure 3:
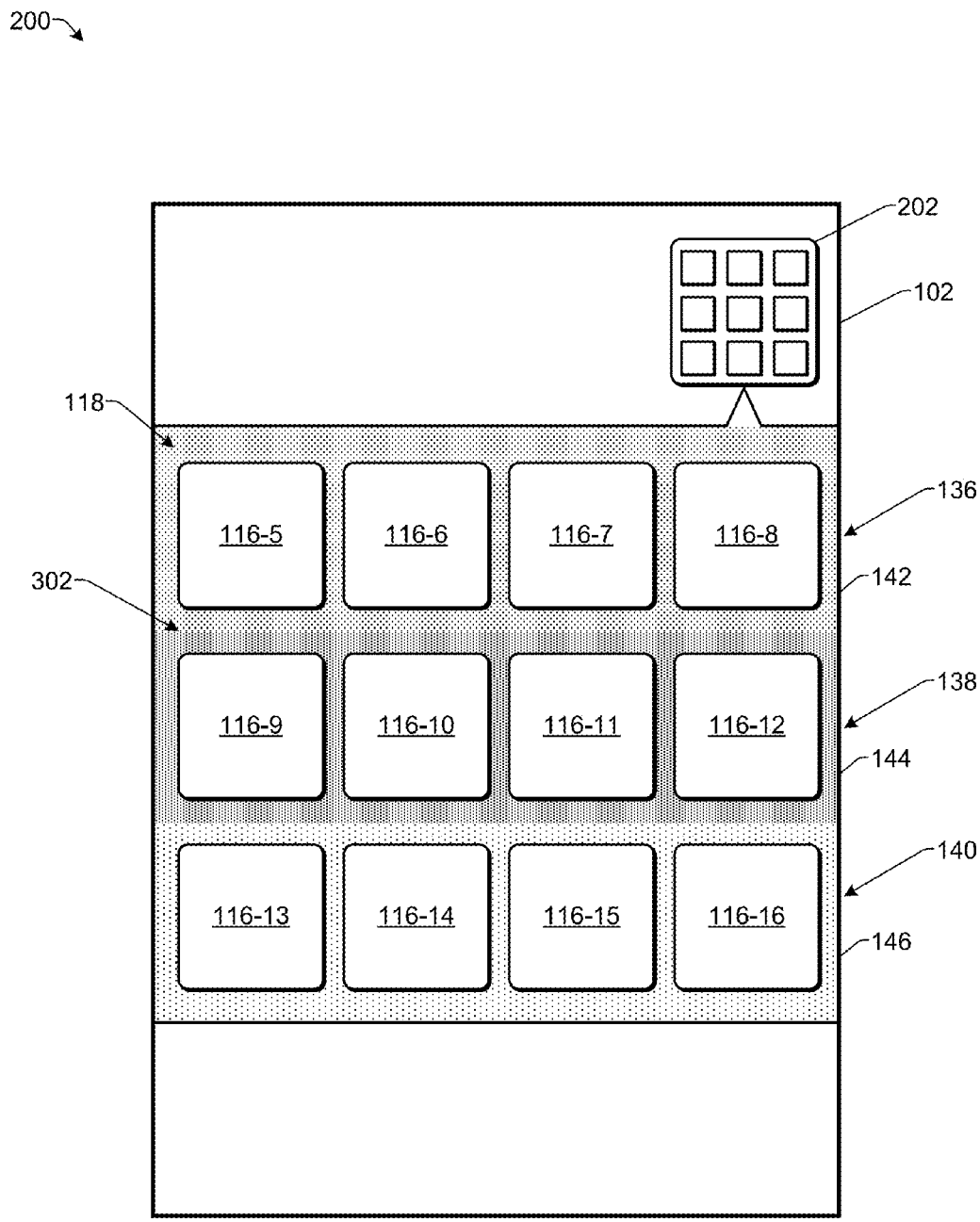
FIG. 3 illustrates an example interface with icon management according to some implementations.

FIG. 3 illustrates an example of the interface 200 following the user accessing the directory representation 202. For example, the user may tap on or otherwise select the directory representation 202 to display the icons 116-5 through 116-16 included in the directory representation 202. Accordingly, in this example, the group 118 of icons from FIG. 1 is included in the directory representation 202, rather than being displayed directly on the first page 124. When the user opens the directory 202, a designated icon area 302 may be presented on the display 102, such as in place of the first page 124 or as an overlay on the first page 124. As mentioned above, in some examples the icons 116-5 through 116-16 may correspond to the items accessed most frequently by the user on the electronic device 100. In other examples, the icons 116-5 through 116-16 may correspond to items that are selected based on a currently detected context detected by the electronic device 100.

In some examples, as illustrated, the icons may be divided in groups, such as areas or rows 136, 138, 140 discussed above in which each row includes icons selected by the device based on a different characteristic. Each different area or row 136, 138, 140 may be visually distinguished from other areas 136, 138, 140 by a visually distinguishing feature 142, 144, 146, respectively, such as having a different colored or patterned background, a different border or outline, a different label, and so forth.

Alternatively, in some examples, there may be two or more different directory representations 202 displayed on the first page 124 or elsewhere in the interface 114. For example, a first directory representation 202 may contain icons managed based on a first characteristic such as being used most frequently on the device 100. A second directory representation 202 may be managed based on another characteristic, such as based on a currently detected context of the electronic device 100. A third directory representation 202 may be managed based on still another characteristic, such as containing icons of applications or other items in a network-accessible catalog that are recommended for downloading to the device 100 based on a current context. A fourth directory representation 202 may be managed based items that are recommended for deletion from the device 100, such as based on having not been used recently, or the like. Further, not all of the directory representations 202 need be located on the first page. For example, a directory representation containing icons of items recommended for deletion may be located on the last page of the interface 114 or some other suitable location.

In addition, as discussed above, rather than having separate directory representations 202 for each of the above-described characteristics, separate pages in the interface 114 may be designated for each of these characteristics. For example, the first page 124 may contain user-selected or user-managed icons. Separate second, third, fourth and fifth pages may each include icons based on a different characteristic, such as being used most frequently, being based on a current context, being applications recommended for downloading, and/or icons of items recommended for deletion, respectively.

Figure 4:
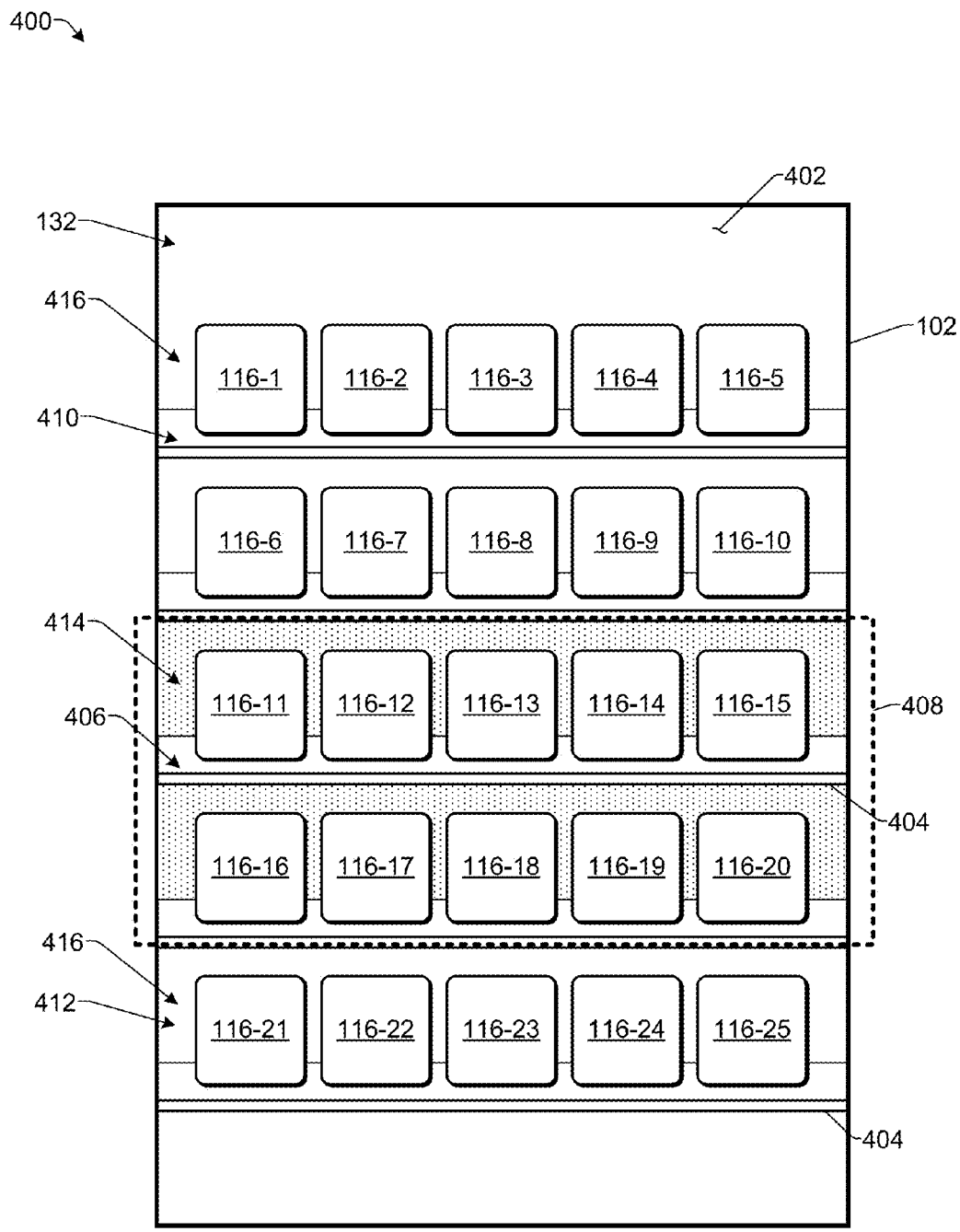
FIG. 4 illustrates an example interface with icon management according to some implementations.

FIG. 4 illustrates an example interface 400 with icon management according to some implementations. In this example, the user interface 400 includes a home page or first page 402 that includes a plurality of icons 116-1 through 116-25 arranged as if on a graphic icon of shelves 404. For example, the first page 402 may be the first page of icons 116 presented to the user when the user accesses the interface 400, such as following turning on, activating, awakening, or logging in to the device 100, or when the user otherwise accesses the interface 400 of the electronic device 100, such as following closing of another interface, an application, a content item or the like. The user may scroll to another page of icons 116, or to one or more additional shelves 404 of icons 116, such as in an up-down or left-right manner.

In this example, a device-managed designated icon area 406, as indicated by the dashed line 408, may be designated by the user or by the device 100 for receiving icons, such as icons of more frequently used items, or icons of items selected based on a current context of the device 100. In some examples, the designated area 406 may occupy the entire first page 402, while in other examples, the designated area 406 may occupy only a portion of the first page 402, as illustrated, while a remainder of the first page 402 may include areas 410 and 412, containing icons 116-1 through 116-10 and 116-21 through 116-25, respectively, that are managed manually by the user. In some cases, the user may adjust the size of the designated area 406 to control the number of icons 116 that are automatically managed according to context or other characteristics. Accordingly, one or more first groups 414 of icons may be managed automatically by the electronic device 100, while one or more second groups 416 of icons may be managed manually by the user. Furthermore, in some examples, rather than having the first area 406 on the first page 402, a directory representation may be included in the interface 400 on a first page, or other page, of the interface, as discussed above with respect to FIGS. 2 and 3.

Figure 5:
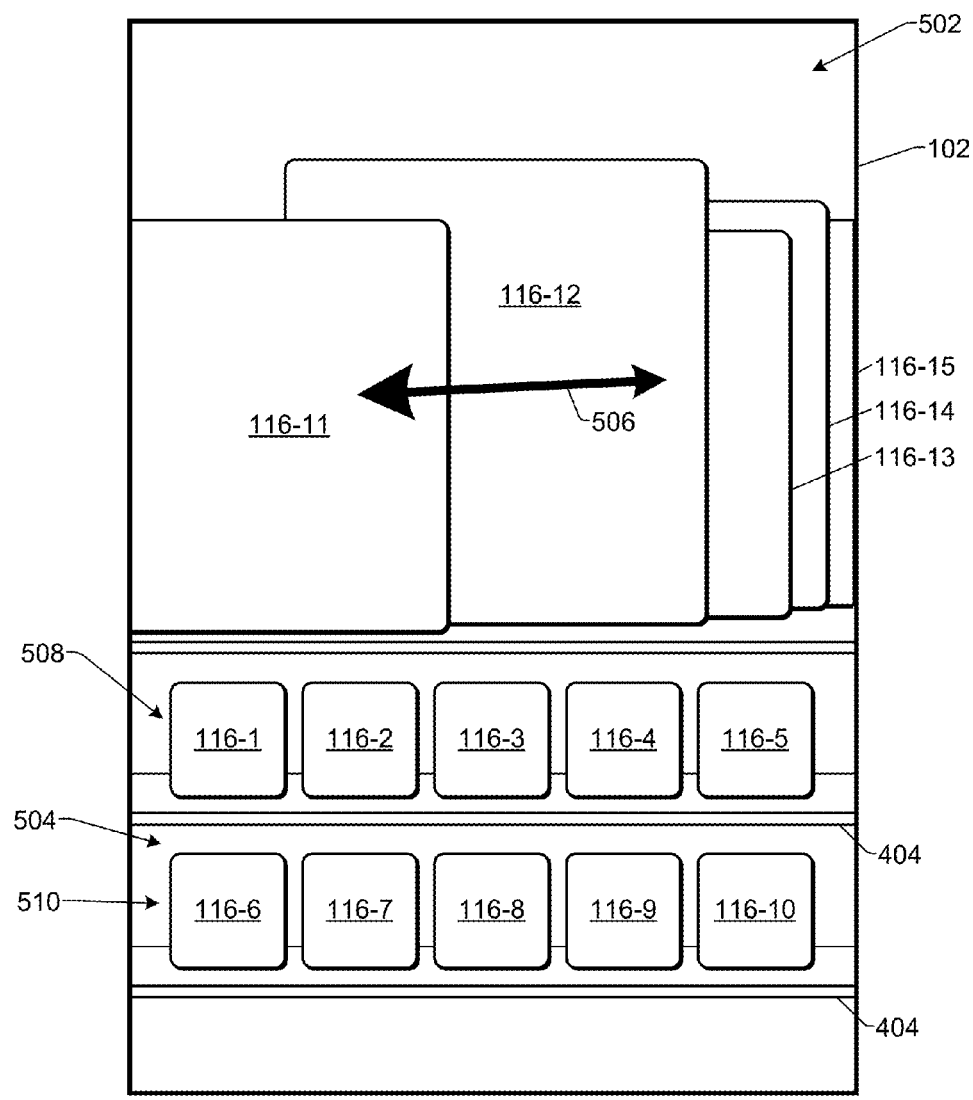
FIG. 5 illustrates an example interface with icon management according to some implementations.

FIG. 5 illustrates an example interface 500 with icon management according to some implementations. In this example, the interface 500 includes a first area 502 in which the individual icons 116 are scrollable partially in a z-axis direction (i.e., into or out of the page), and a second area 504 in which the icons 116 are arranged in a shelf-like manner, as discussed above with respect to FIG. 4, and may be scrollable up/down and/or left/right. In this example, one of the areas 502 or 504 may be designated to receive icons managed by the electronic device, such as according to frequency of use or detected context. The other of the areas 502 or 504 may include icons that are managed manually by the user. Accordingly, as a first example, the area 504 may include icons 116-1 through 116-10 that are managed manually by the user, while the area 502 may be a designated area to receive icons 116-11 through 116-15, and more that may be included behind the icon 116-15, that are automatically managed by the electronic device 100. For example, the user may scroll through the icons 116-11 through 116-15, and through any icons behind icon 116-15, by sliding a finger or other input effecter in the direction of arrow 506.

As another example, multiple areas of the interface 500 may be managed by the electronic device 100. For instance, the icons 116-11 through 116-15 may be managed according to a first characteristic, while a group 508 of icons 116-1 through 116-5 may be managed according to a second characteristic, and a group 510 of icons 116-6 through 116-10 may be managed manually by the user. As one example, the icons in the area 502 may be managed based on being accessed most recently by the user, while the icons in the area 508 may be managed based on being accessed most frequently by the user. Alternatively, either the icons in the area 502 or icons in the area 508 may be managed based on a currently detected context of the device 100. Numerous other variations will be apparent to those of skill in the art having the benefit of the disclosure herein.

Figure 6:
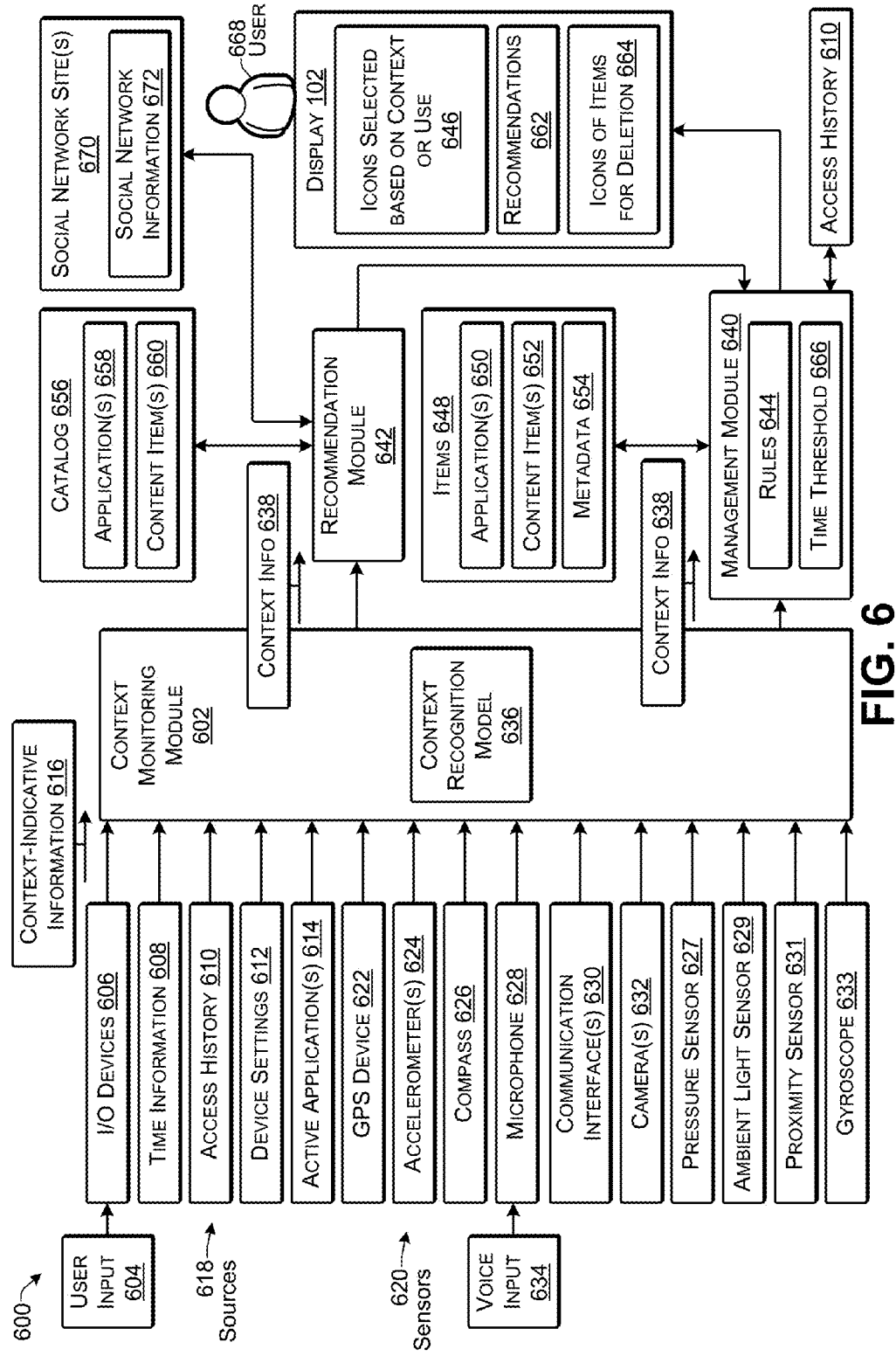
FIG. 6 illustrates an example framework for icon and item management according to some implementations.

FIG. 6 illustrates an example framework 600 for performing context monitoring, icon management, item management and/or item recommendation on the electronic device 100 according to some implementations. In this example, the electronic device 100 may include a context monitoring module 602 that may be executed on the electronic device 100. The context monitoring module 602 may receive information from a plurality of component, sensors and other sources of information. For instance, the context monitoring module 602 may receive user input 604 through one or more input output (I/O) devices 606. The user may provide user input through any of a touch screen, a mouse, keyboard, keypad, a remote control, a joystick, a trackball, buttons, or any other I/O devices, examples of which are enumerated elsewhere herein. The context monitoring module 602 may further receive time information 608, such as from a computer clock, an online source, or the like, to indicate the time of day, the day of the week, the date, the month, the year, etc.

As another example, the context monitoring module 602 may receive an access history 610, which may list each instance in which each application or program has been accessed, used or executed on the electronic device 100. The access history 610 may similarly track the accesses to content items on the device 100. As one example, the access history may be based at least in part on a load file of the device 100 or the results of another suitable tracking module. Further, the access history 610 may include an indication of a context at the time of each access to an application or a content item. For example, the context monitoring module 602 may record context information that is applicable at the time of each access to each item on the device 100. As one example, if the access history 610 shows that a user accesses a particular shopping application when the context information shows that the device 100 is located at a shopping mall, then this information can be applied by a management module of the device 100 when determining which icons to move into the device-managed icon area when the current context shows that the device is again located at a shopping mall.

In addition, the context monitoring module 602 may receive or may access device settings 612 that may specify one or more settings, such as user preferences for when the device 100 can move icons, how much of the first page includes device-managed icons, when the device 100 is permitted to delete applications or content items, and so forth. Furthermore, the context monitoring module 602 may identify one or more active applications 614 that are currently active or executing on the device 100, such as being used currently by a user of the device 100, or currently displaying an interface on the display 102, which may provide an indication of a current use of the device or an activity of the user. Thus, the context monitoring module may receive context-indicative information 616 from a plurality of sources 618 that may be used to determine a current context of the device 100.

Additionally, the context monitoring module 602 may also, or alternatively, receive context-indicative information 616 from one or more sensors 620 on the device 100. Examples of sensors 620 include a GPS (Global Positioning System) device 622, one or more accelerometers 624, a compass 626, a pressure sensor 627, a microphone 628, an ambient light sensor 629, one or more communication interfaces 630, a proximity sensor, 631 one or more cameras 632 and/or a gyroscope 633. For example, the accelerometer(s) 624 can be monitored in the background to check for motion that is indicative of certain types of activity or movement of the device 100 and the user. Various different types of motion, such as gaits, cadence, rhythmic movements, and the like, can be detected by the accelerometer(s) 624 and may be indicative of walking, jogging, running, and so forth. The compass 626 and gyroscope 633 may further indicate motion based on a change in direction of the device 100. The proximity sensor 631 may indicate whether the device or a portion of the device is near to a surface, such as a hand of a user, a face of a user, a lap or a user, a table or other surface or object.

The microphone 628 may receive a voice input 634 from the user, which for example may request that certain icons be presented in the device-managed designated icon area of the user interface. For example, the user may submit a voice command such as "show news apps," to cause the device 100 to display a plurality of icons 116 of applications capable of presenting various types of news on the electronic device 100. In some cases, such a command from the user may override any other context-based movement of icons 116 into the designated device-managed icon area. The microphone 628 may also be used to assist in detecting a current context of the device, such as by detecting noises or sounds that may be indicate particular locations or activities.

The communication interfaces 630 can indicate a physical location of the electronic device 100, such as based on identification of a cell tower, a wireless access point, or the like, that is within range of the electronic device 100. For example, a Wi-Fi-based positioning system may be used where GPS is inadequate such as due to signal blockage, or the like. A localization technique used for positioning based on one or more wireless access points can include measuring the intensity of the received signal and/or Wi-Fi "fingerprinting," in which a radio map of a given area is created based on a probability distribution of signal strength data from one or more access points, and live signal strength values are then compared with the fingerprint. Further, a change in signal strength from a cell tower, wireless access point, or the like, can indicate movement of the device 100. In addition, the communication interfaces 630 may communicate with network resources, such as search engines, an online store, a network-accessible catalog and so forth, such as to enable making recommendations, as discussed below.

The GPS device 622 can identify a location of the electronic device 100, and can detect movement of the device 100 from a first location to a second location. In some examples, the GPS device 612 may be activated only periodically unless movement of the device 100 has been detected, in which case the GPS device 622 may begin monitoring the direction of travel, velocity of travel, etc. For example, movement may initially be detected by the accelerometer 624, which may then cause activation of the GPS device 622.

Further, in some cases, the camera 632 may be used to detect a context, such as by determining a location of the device. For example, in the case that the device 100 is an augmented reality device 100-7, such as a helmet, goggles or glasses, the device 100 may have a camera 632 that is active while the device is on for detecting various surroundings, landmarks, signs and so forth. Camera(s) 632 in other types of devices 100 may be similarly used for determining a current context, if permitted by the user. The ambient light sensor 629 may determine a light level of an environment surrounding the device 100. Further, the pressure sensor 627 may indicate an altitude of the device 100, a surrounding barometric pressure, or the like.

The context monitoring module 602 may include a context recognition model 636, which may be a trained statistical model that receives context-indicative information 616 from sensors 620 (e.g., GPS device 622, accelerometer(s) 624, compass 626, microphone 628, communication interface 630, camera 632, and so forth) and sources 618 of device information (e.g., user input to I/O devices 606, time information 608, access history 610, device settings 612, active applications 614, and so forth), and that determines a context, such as a location, activity, or the like. For example, the context recognition model 636 may determine an activity of the user of the device 100 such as whether the device is in motion, e.g., being carried by a user who is walking, jogging, running, biking, skating, skiing, horseback riding, driving a car or other vehicle, or the like. As mentioned above, the context monitoring module 602 may run as a background process and may provide information from one or more of the sensors 620 or sources 618 to the context recognition model 636, as the information is received. For instance, the GPS device 622 may periodically determine a location of the user. The location determined by the GPS device 622 may be cross-referenced with information obtained through the communication interfaces 630, such as by accessing an online map or search engine to determine what is at the identified location, which may be indicative of a current location and/or activity, such as a shopping mall, a sports stadium, etc.

The electronic device 100 may use any combination of the inputs from the multiple different sensors 620 and sources 618 for detecting a current context of the device 100. Further, the electronic device 100 may allow some sensors, such as the accelerometers 624, to operate in the background, while other more power-thirsty sensors, such as the GPS device 622 may remain off until some type of movement is detected by the sensors operating in the background. For instance, the accelerometers may provide sensor information that is indicative of a pattern of movement corresponding to walking or running. The device 100 may then activate the GPS device 622 to obtain additional information.

The context recognition model 636 may take all the received context-indicative information 616 from the sensors 620 and sources 618, and may apply the model 636 to the received information to provide context information 638 to at least one of a management module 640 or a recommendation module 642. For instance, the context information 638 may indicate any of a current location of the user, a current activity of the user, a time and day of the week, or the like. The management module 640 may receive the context information 638 from the context recognition model 636, and may apply one or more rules 644 to determine how to apply the context information 638. For instance, the management module 640 may select one or more icons 646 based on the context information 638 to move into the designated device-managed icon area (e.g., area 120, 406, 502, 504 directory 202, as discussed above), while moving one or more other icons out of the device-managed icon area or directory, respectively.

When selecting the icons 646 to move into the device-managed icon area, the management module 640 may access information about a plurality of items 648, such as applications 650 and content items 652 that are accessible on the device 100. For example, the items 648 may each have metadata 654 associated with them that identifies at least a type or category of the item. Thus, certain applications 650 may be categorized into one or more of various categories, such as business, news, travel, sports & fitness, lifestyle, games, social networking, entertainment, education, family & kids, music, photo & video, to name a few. Further, the content items 652 may be any of the numerous different types or categories of content items described above. Thus, based on the current context information 638, the management module 640 may select one or more icons 646 to present in the designated device-managed icon area. For example, if the context shows that the user is at work (e.g., based on day of the week, time of day, and location of the device, the device may add one or more items categorized with business metadata to the icon area.

In addition, the management module 640 may refer to the access history 610 to determine which of the items 648 the user has accessed most frequently under the same or similar context. For instance if the access history 610 shows that the user has frequently accessed a particular news application in the mornings during weekdays while located at the office, the management module 640 may automatically move this particular news application icon into the designated icon area each weekday morning and, later in the day, replace the particular news icon with a different icon of an item 648 that the user uses more frequently in the afternoons or evenings. Thus, based at least in part on these considerations, the management module 640 may automatically control which icons are presented in the designated device-managed icon area of the user interface at any particular time.

In some examples, the recommendation module 642 receives the context information 638, and may conduct a search based at least in part on the context information 638. For instance, the recommendation module 642 may send a query to search a network-accessible catalog 656, such as an app store, that includes application(s) 658 and/or content item(s) 660 available for download to the device 100. Thus, the recommendation module may send a query that is derived from or otherwise based on the context information 638. For example, if the context information 638 indicates that the user is currently at a particular museum, venue, etc., the recommendation module 642 may send a query to the network-accessible catalog 656 to locate an application for the particular museum, venue, etc., if such is available in the network-accessible catalog 656. Similarly, if the context information 638 indicates that the user is currently exercising, the recommendation module 642 may send a query to the network-accessible catalog 656 to attempt to locate a top-rated exercise application. Upon identifying a recommended application 658 or content item 660 corresponding to the current content information 638, the recommendation module either may present this recommendation information directly on the display, or may provide the recommendations to the management module 640, which may present the one or more recommendations 662, such as in a designated device-managed icon area.

As one example, the context information 638 may identify a location at which the device 100 is currently physically located. For example, suppose that the device is located at a particular shopping mall. The recommendation module 642 may search the network-accessible catalog 656 for relevant items and may locate an application for the particular shopping mall. The recommendation module 642 may present an icon of the application for the particular shopping mall or other notification of the recommendation or recommendation information in a particular area in the user interface, such as in a designated directory, on a designated page, in a designated area for recommendations, or the like.

In addition, the management module 640 may identify one or more items 664 for deletion or removal from the device 100. For example, the management module 640 may compare the items 648 with the access history 610 and a time threshold 666 to determine if any of the items 648 have not been accessed within the time threshold 666. Consequently, such items may be identified for deletion, and corresponding icons may be presented on the display 102 for consideration by a user 668. In some examples, the icons may be added to a recommended deletion directory, which may be displayed to the user as a directory representation 202, as discussed above with respect to FIGS. 2-3. Further, it may happen that multiple icons for a particular item are created. For example, an icon for a particular application may be placed into the recommended deletion directory, while also being included in other locations, such as in another device-managed icon area, when appropriate.

Further, as mentioned above, a user may make a voice input or other user input to request presentation of a category or type of icon. For example, the user may state, "show games." In response, the device may identify from the metadata 654 the game-related items 648 on the device 100, and may present icons 116 of these items in a designated device-managed icon area 120, 302, 406, 502, 504, or the like, as discussed above. In some examples, in addition to considering metadata 647, the device may consider other items 648 accessed by the user under a similar context, such as while playing a game.

In addition, in some examples, the recommendation module 642 may access one or more microblog sites, social network feeds, or social network sites 670 to obtain social network information 672 when determining recommendation information to provide to the management module 640. For example, the social network information 672 may indicate one or more items that were accessed or downloaded by other users that are friends with the user 668, such as on Facebook® or other social network site; other users that follow or are followed by the user 668, such as on Twitter® or other microblog site; other users in the user's contact list, friends lists, etc.; or other users that are otherwise affiliated in a group with the user 668.

As one example, suppose that the context monitoring module 602 has determined that the user 668 is in a particular location or is performing a particular activity. The recommendation module 642 may access the social network information 672 based on this context information to determine what items other users accessed at the location or during performance of the particular activity. The recommendation module 642 may then provide recommendation information to the management module 640. For example, if a recommended item is already on the electronic device 100, the management module 640 may move the corresponding recommendation into a designated area, such as area 120 described above. If the recommended item is not already on the electronic device 100, the management module 640 may present an icon of the recommended item and/or an indication that the recommended item is recommended for download to the electronic device 100. Numerous other variations will be apparent to those of skill in the art having the benefit of the disclosure herein.

Figure 7:
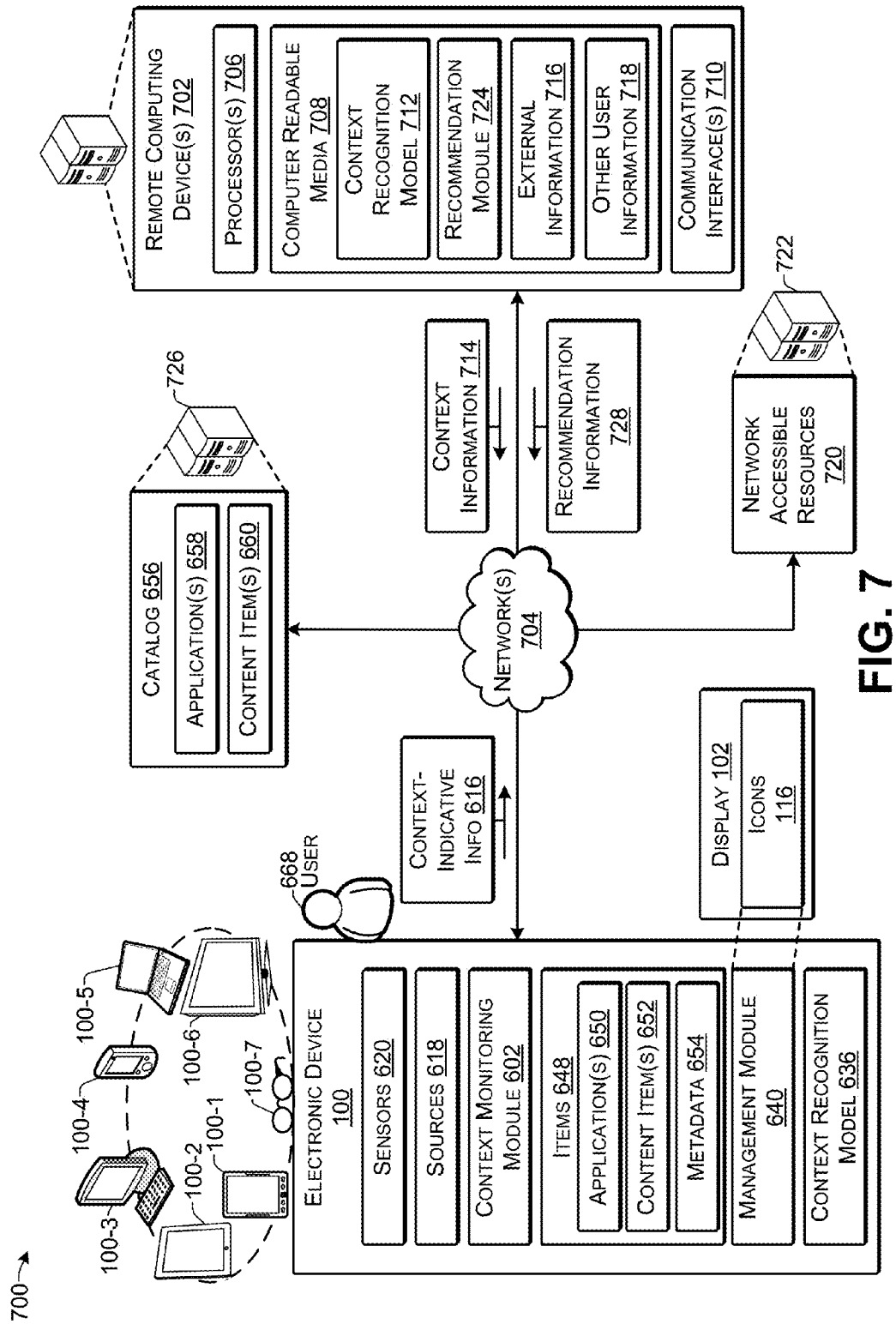
FIG. 7 illustrates an example system for icon management according to some implementations.

FIG. 7 illustrates an example system 700 that may be employed to offload a portion of the processing from the electronic device 100 to one or more remote computing devices 702 according to some implementations. The remote computing device(s) 702 may be provided by a service provider, such as an entity that provides a cloud-based service to the electronic device 100. In this example, the electronic device 100 may be able to communicate with one or more remote computing devices 702 through one or more networks 704. For example, the network(s) 704 may include a local area network (LAN), a wide area network (WAN), such as the Internet, or any combination thereof, and may include both wired and wireless communication technologies, including cellular communication technologies. The remote computing device 702 and the electronic device 100 may communicate and interact with one another using any combination of suitable communication and networking protocols, such as Internet protocol (IP), transmission control protocol (TCP), hypertext transfer protocol (HTTP), cellular communication protocols, and so forth.

For example, it may be more economical to allow the remote computing device 702 to perform the processing for determining a context and/or determining recommendations of applications and content items for the electronic device 100. For example, by sending context-indicative information 616 (or context information 638) to a remote computing device 702, the electronic device 100 may conserve power and avoid processor intensive use of resources. Further, the remote computing device 702 may access additional resources that may enable the provision of more accurate or more appropriate context information or recommendations to the user 668 of the electronic device 100. Accordingly, the remote computing device 702 may provide one or more computing services to the electronic device 100.

In the illustrated example, each remote computing device 702 may include one or more processors 706, one or more computer readable media 708 and one or more communication interfaces 710. Each processor 706 may be a single processing unit or a number of processing units, and may include single or multiple computing units or multiple processing cores. The processor 706 can be configured to fetch and execute computer-readable instructions stored in the computer-readable media 708 or other computer-readable media.

The computer-readable media 708 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the computing device 702, the computer-readable media 708 may be a type of computer-readable storage media and may be a tangible non-transitory storage media.

The communication interface(s) 710 may include one or more interfaces and hardware components for enabling communication with various other devices, such as the electronic device 100, over the network(s) 704. For example, communication interface(s) 710 may facilitate communication through one or more of the Internet, cable networks, cellular networks, wireless networks (e.g., Wi-Fi, cellular) and wired networks. Various different approaches to implementations described herein can be implemented in various environments. For instance, the network(s) 704 may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and will not be discussed herein in detail.

In some examples, the remote computing device 702 may include a context recognition model 712 which may receive the context-indicative information 616 and determine context information 714. Thus, the electronic device 100 may send context-indicative information 616 to the remote computing device 702 over the network(s) 704, such as from sensors 620 (which may include the GPS device 622, accelerometer(s) 624, compass 626, microphone 628, camera(s) 632, and various other sensors included in the electronic device 100) and sources 618 (which may include I/O devices 606, access history 610, device settings 612 and active applications 614). The remote computing device 702 may then send back context information 714 to the electronic device 100 for use by the management module 640. When determining the context information 714, the remote computing device 702 may access other sources of information, such as external information 716 and other user information 718. For example, the external information 716 may include information such as time and day of the week, maps indicating what is at a current location of the device 100, weather at a current location of the device 100, planned events at a current location of the device 100, and various other types of information related to the current context of the device 100. In some cases, the context recognition model 712 may access one or more network accessible resources 720, such as may be provided on one or more web servers or other computing devices 722, to obtain certain types of external information 716 that are not already stored at the remote computing device 702. In addition, the other user information 718 may indicate items accessed by other users under the same or similar contexts. For example, the remote computing device 702 may aggregate context-indicative information 616 from a plurality of electronic devices, such as the access histories, to determine items that users may typically access in a variety of different contexts. In addition, in some examples, the other user information 718 may include the social network information 672 discussed above, such as identification of items accessed by friends of the user 668 under similar contexts. For example, the network accessible resources 720 may include the microblog sites, social network feeds, or social network sites 670 discussed above. Thus, when a current context of a device includes a location at which the device has never been before, the context information 714 may still indicate an item, such as an application that other users accessed at the location. Further, since the context recognition model 712 is maintained on a remote server in this example, this model 712 may be trained and updated on the remote computing device 702 without having to update the context recognition model on each individual electronic device 100.

The remote computing device 702 may further include a recommendation module 724, which may identify one or more applications 658 or content items 660 to recommend to the electronic device 100 in a manner similar to the recommendation module 642 discussed above with respect to FIG. 6. For example, the recommendation module 724 may be able to communicate with one or more computing devices 726 of the network-accessible catalog 656, such as for searching the network-accessible catalog 656 as discussed above. In addition, when determining recommendation information 728 to send to the electronic device 100, the recommendation module 724 may employ the network accessible resources 720, which may include the social network information 672 discussed above. Accordingly, the recommendation module 712 may access or utilize various types of external information 716 when determining appropriate recommendation information 728 to provide to the electronic device 100. For instance, the recommendation module 724 may access external information 716, such as maps, weather information, news information, local event information, time and day, and so forth, from the network accessible resources 720 when determining appropriate recommendation information 728 for the electronic device 100. The recommendation information 728 may also be based on other user information 718, which may include information based on an aggregation of information collected from a plurality of users of other electronic devices 100, as discussed above. Additionally, or alternatively, the recommendation module 724 may access social network information 672, either at the network accessible resources 720 or at the network-accessible catalog 656 to determine applications 658 or content items 660 that friends of the user 668 may have downloaded or used in contexts similar to a current context of the electronic device 100.

An icon of an item identified by the recommendation information 728 may be presented by the management module 640 in a designated device-managed icon area, such as those discussed above with respect to the interfaces 114, 200, 400 or 500. As one example, the first page of the user interface 114 may include a directory representation 202, as discussed above with respect to FIGS. 2 and 3, that includes icons of recommended items for a current context. The management module 640 may change the icons contained in the icon directory 202 as the detected context of the device 100 changes, and as the corresponding recommendations 662 or recommendation information 728 change accordingly.

Figure 8:
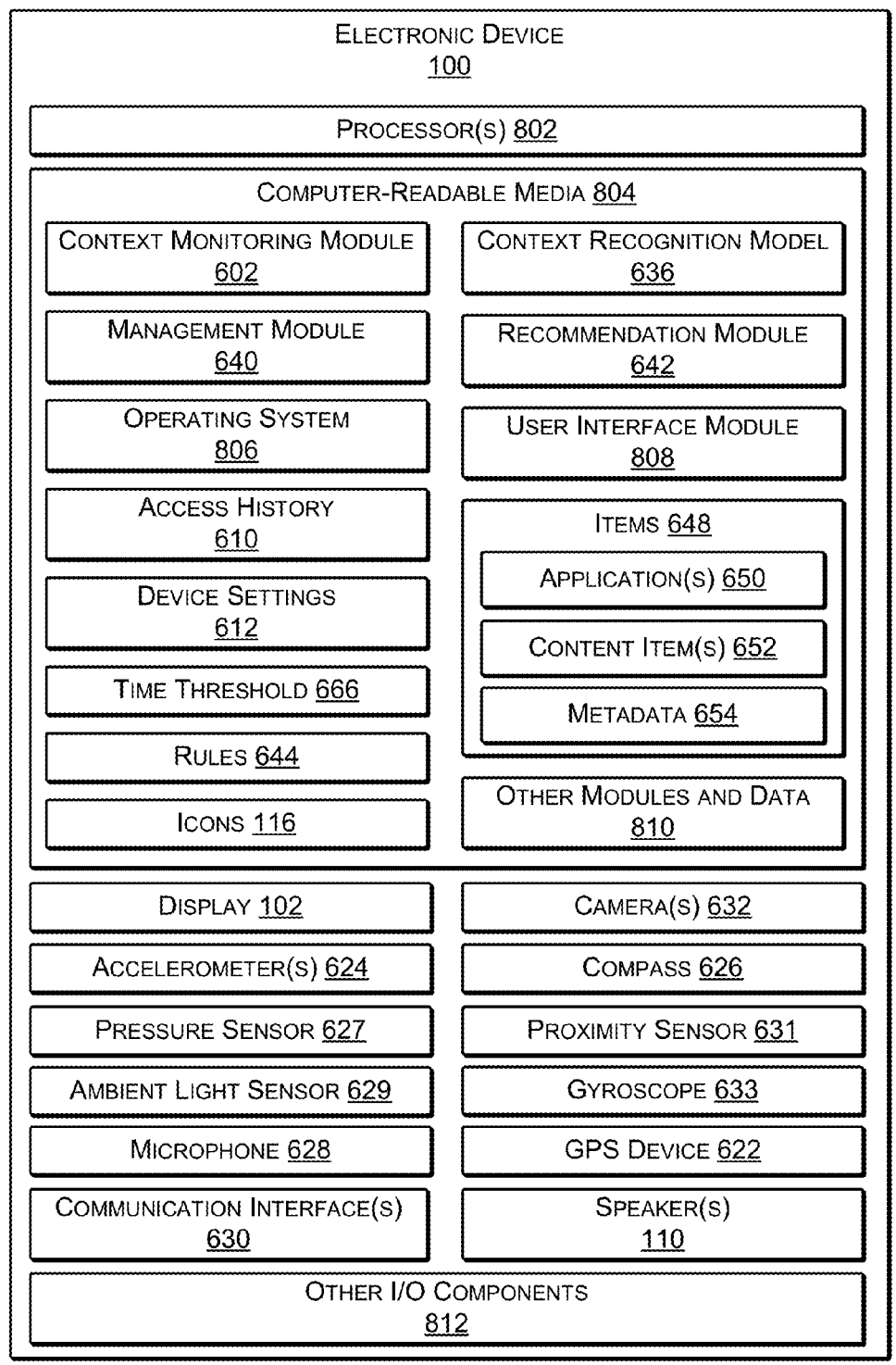
FIG. 8 illustrates select components of an example electronic device according to some implementations.

FIG. 8 illustrates select example components of the electronic device 100 that may be used to implement the functionality described above according to some implementations. In a very basic configuration, the electronic device 100 includes, or accesses, components such as at least one control logic circuit, central processing unit, or processor 802 and one or more computer-readable media 804. Each processor 802 may itself comprise one or more processors or processing cores. For example, the processor(s) 802 may include one or more low power cores, one or more high power cores, one or more graphics processing units, and so forth.

Depending on the configuration of the electronic device 100, the computer-readable media 804 may be an example of tangible non-transitory computer storage media and may include volatile and nonvolatile memory and/or removable and non-removable media implemented in any type of technology for storage of information such as computer-readable instructions, data structures, program modules or other data. The computer-readable media 804 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the electronic device 100 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules or components that may be executed by the processor 802.

The computer-readable media 804 may be used to store and maintain any number of functional components that are executable by the processor 802. In some implementations, these functional components comprise instructions or programs that are executable by the processor 802 and that, when executed, implement operational logic for performing the actions attributed above to the electronic device 100. Functional components of the electronic device 100 stored in the computer-readable media 804 may include the context monitoring module 602, executable by the processor 802 for detecting a context of the electronic device 100 such as by application of a context recognition model 636, as discussed above. Additional functional components stored in the computer-readable media 804 may include the management module 640, which may be executed by the processor 802 for managing the locations of icons 116 in the user interfaces generated on the display 102. The computer-readable media 804 may further include the recommendation module 642 in some examples in which the recommendation module 642 is executed on the electronic device 100. Other functional components may include an operating system 806 and a user interface module 808 for controlling and managing various functions of the electronic device 100, for generating the user interfaces, and for providing basic functionality. Any or all of the modules 602, 640, 642 and 808 may be integrated into the operating system 806, or may be operable separately therefrom. Additionally, the computer readable media 804 may include the items 650, including one or more applications 650, that may be executed to cause the device 100 to perform various functions and uses.

In addition, the computer-readable media 804 may also store data, data structures and the like, that are used by the functional components. For example, data stored by the computer-readable media 804 may include the one or more content items 652, metadata 654, the access history 610, device settings 612, a time threshold 666, rules 644 used by the management module, and icons 116. Depending on the type of the electronic device 100, the computer-readable media 804 may also optionally include other functional components and data, such as other modules and data 810, which may include applications, programs, drivers and so forth, and the data used by the functional components. Further, the electronic device 100 may include many other logical, programmatic and physical components, of which those described are merely examples that are related to the discussion herein.

Further, while the figures illustrate the functional components and data of the electronic device 100 as being present on the electronic device and executed by the processor(s) 802 on the electronic device 100, it is to be appreciated that these components and/or data may be distributed across different computing devices and locations in any manner. For example, some or all of the various functionality described above for the recommendation module 642 and/or the context monitoring module 602 and context recognition model 636 may be distributed in various ways across different computing devices.

FIG. 8 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. Additionally, in some implementations, the display 102 may be a 3D display capable of providing a 3D image. For example, the display 102 may produce a 3D image by providing alternating left-eye and right-eye images with or without the use of shuttering or filtering eyeglasses. Accordingly, in some implementations, the content items and user interfaces herein may be rendered in 3D.

Other components included in the electronic device 100 may include various types of sensors, which may include the one or more accelerometers 624, the compass 626, the pressure sensor 627, the microphone 628, the ambient light sensor 629, the GPS device 622, the proximity sensor 631, the gyroscope 633 and one or more cameras 632. The one or more communication interfaces 630 may support both wired and wireless connection to various networks, such as cellular networks, radio, WiFi networks, short-range or near-field networks (e.g., Bluetooth®), infrared signals, local area networks, wide area networks, the Internet, and so forth. The communication interfaces 630 may further allow a user to access storage on another device, such as a remote computing device, a network attached storage device, cloud storage, or the like.

The electronic device 100 may further be equipped with the one or more speakers 110 and various other input/output (I/O) components 812. Such I/O components may include a touchscreen and various user controls (e.g., buttons, a joystick, a keyboard, a keypad, etc.), a haptic or tactile output device, connection ports, and so forth. For example, the operating system 806 of the electronic device 100 may include suitable drivers configured to accept input from a keypad, keyboard, or other user controls and devices included as the I/O components 812. For instance, the user controls may include page turning buttons, navigational keys, a power on/off button, selection keys, and so on. Additionally, the electronic device 100 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 9:
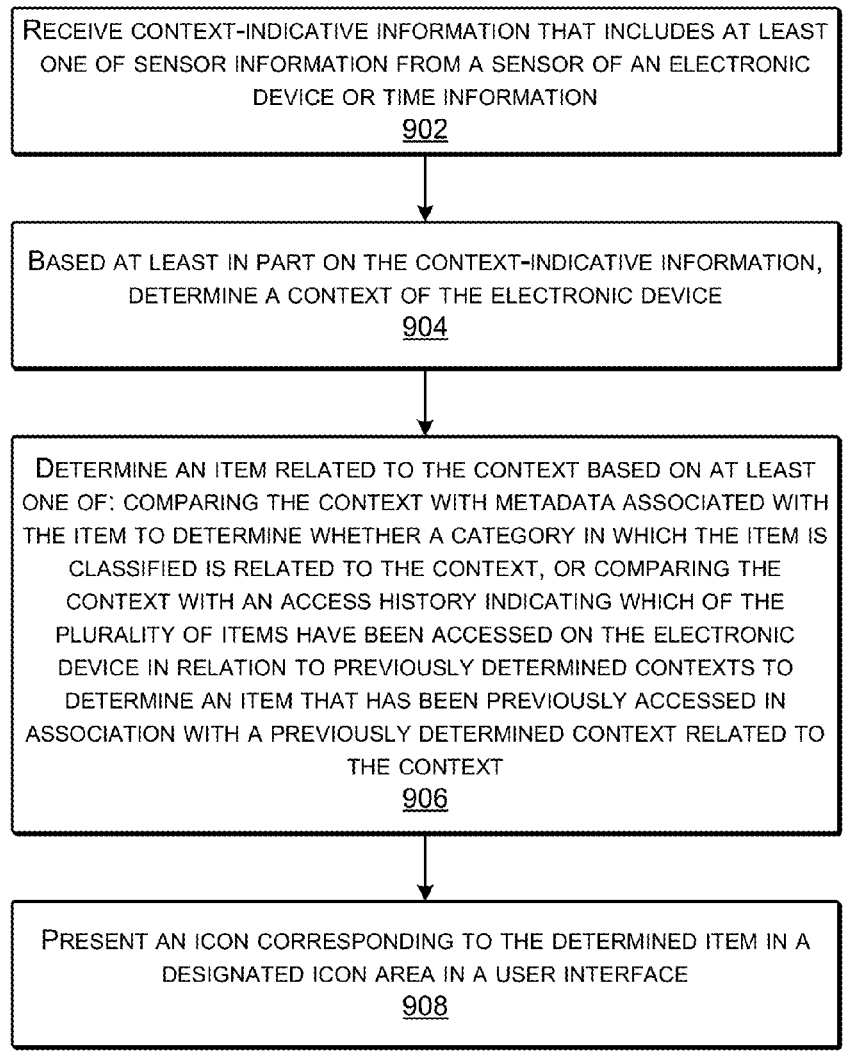
FIG. 9 is a flow diagram illustrating an example process for icon management that may be executed by an electronic device according to some implementations.
Figure 10:
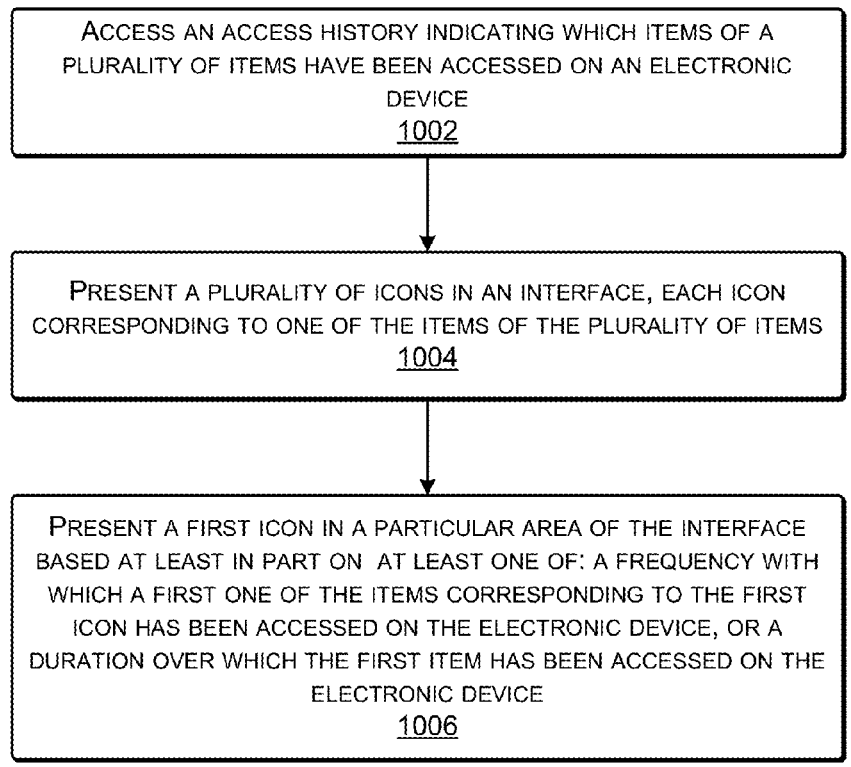
FIG. 10 is a flow diagram illustrating an example process for icon management that may be executed by an electronic device according to some implementations.
Figure 11:
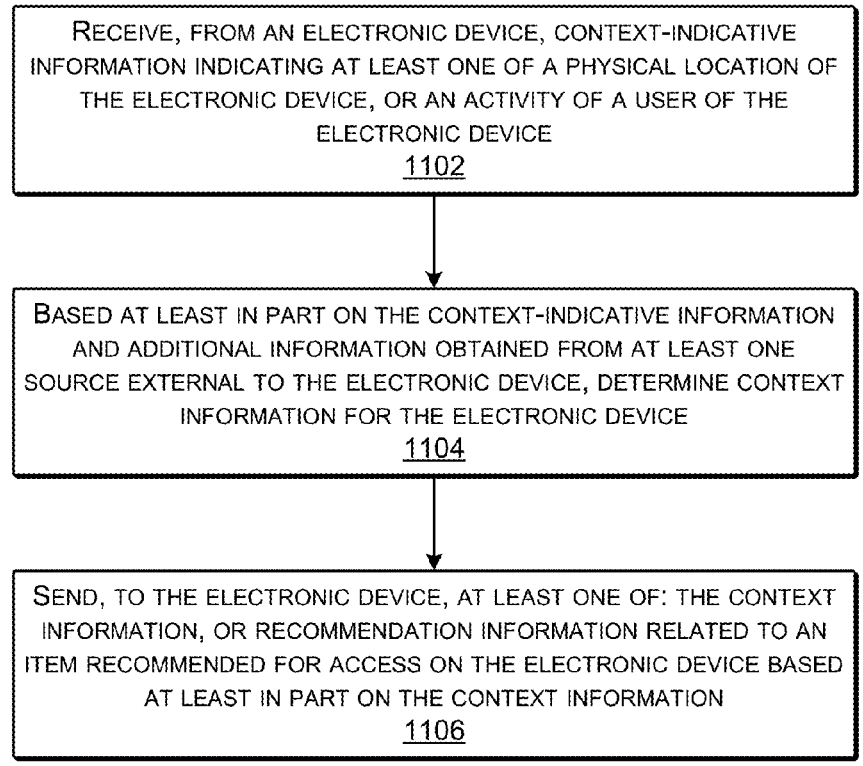
FIG. 11 is a flow diagram illustrating an example process for icon management that may be executed by a remote computing device according to some implementations.

FIGS. 9-11 illustrate example processes for providing icon and or item management on an electronic device according to some implementations. These processes are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, environments and frameworks described in the examples herein, although the processes may be implemented in a wide variety of other architectures, environments or frameworks.

FIG. 9 is a flow diagram illustrating an example process 900 that may be executed, at least in part, by an electronic device according to some implementations.

At 902, the device receives context-indicative information that includes at least one of sensor information from a sensor of the device, or time information. For example, the device may receive a variety of context-indicative information, such as location information or other sensor information, such as from a GPS device, an accelerometer, a compass, a microphone, a communication interface and/or a camera, and which may be used to determine at least one of a location or an activity of the user of the device. Furthermore, the time information may indicate a time of day, day of the week, a date of the year, or the like.

At 904, based at least in part on the context-indicative information, the device determines a current context of the device. For example, the context may include any of a current physical location of the device, a current time of day, a current day of the week, and/or a current activity of a user of the device.

At 906, the device determines an item related to the context based on at least one of: comparing the context with metadata associated with the item to determine whether a category in which the item is classified is related to the context, or comparing the context with an access history indicating which of the plurality of items have been accessed on the electronic device in relation to previously determined contexts to determine an item that has been previously accessed in association with a previously determined context related to the context. For example, the access history may include a record of each application or content item that has been accessed on the device at any point in time, and may further include context information that was determined when the access occurred. Thus, the access history indicates which applications or content items were accessed by the user during various different contexts, including various times of day, days of the week, during various different types of activities, or in various different physical locations. Additionally, as discussed above, the items may be classified into a plurality of different categories, and the category for each item may be identified in metadata associated with the item. By comparing a current context with the categories of the plurality items, a match may be made of a category that relates to the current context. The icons of the most frequently accessed items in a matching category may be presented to the user.

At 908, the device presents an icon corresponding to the identified item in a designated icon area in a user interface. For example, the device may include a designated area for presenting icons corresponding to content items selected as being related to the current context of the device. In some examples, the designated icon area may be on the first page of the user interface presented to the user. In other examples, the designated icon area may be accessed by accessing a directory representation, or may be on a page other than the first page of the interface, such as on a different designated page. Further, in some examples, the interface may include multiple designated icon areas managed by the device for presenting icons having various other characteristics, such as icons of recommended items recommended from an online store or other network-accessible catalog, icons of items most frequently used on the device, icons of items recommended for deletion from the device, and so forth.

FIG. 10 is a flow diagram illustrating an example process 1000 that may be executed, at least in part, by an electronic device according to some implementations.

At 1002, the device accesses an access history indicating which items of a plurality of items have been accessed on an electronic device. For example, the access history may include a record of each application or content item that has been accessed on the device at any point in time, and may further include context information that was determined when the access occurred. Thus, the access history indicates which items have been accessed most frequently on the device. The access history may further indicate which applications or content items were accessed by the user during various different contexts, including various times of day, days of the week, during various different types of activities, or in various different physical locations.

At 1004, the device presents a plurality of icons in an interface, with each icon corresponding to one of the items of the plurality of items. For example, the device may present a user interface that includes a plurality of icons of the items available to be accessed on the device. The user may select one of the icons to access the corresponding item, such as an application, a content item, etc.

At 1006, the device presents a first icon in a particular area of the interface based at least in part on at least one of a frequency with which a first one of the items corresponding to the first icon has been accessed on the electronic device, or a duration over which the first item has been accessed on the electronic device. For example, the device may refer to the access history to determine which items have been accessed most frequently on the electronic device. In some examples, the device may present the icons of items in the user interface based on a frequency of access such as by presenting the icons of the items accessed most frequently on the first page of the interface in a descending order of frequency to the last page of the interface. Additionally, or alternatively, the duration over which an item has been accessed may be considered when arranging icons. For instance, items that have been accessed for longer periods of times may be presented on the first page of the interface in a descending order of duration. In some examples, both frequency and duration may be used for arranging the icons. In other examples, the device may further take into consideration context information when determining which icons to present in the particular area. For example, the device may present icons of those items accessed most frequently during a current context, such as a current location, a current time of day, current day of the week, a current date, or a current activity. Further, the device may present an icon of an item that is identified to be deleted in a designated icon area designated for icons of items to be deleted.

FIG. 11 is a flow diagram illustrating an example process 1100 that may be executed by a remote computing device according to some implementations.

At 1102, the computing device receives, from the electronic device, context-indicative information indicating at least one of a current location of the electronic device or a current activity of a user of the electronic device. For example, the computing device may receive sensor information, such as from a GPS device, an accelerometer, a compass, a microphone, a communication interface and/or a camera. Furthermore, the computing device may receive other information indicative of a current activity, such information regarding one or more applications currently open on the device or current user inputs to the device.

At 1104, based at least in part on the context-indicative information and additional information obtained from a least one source external to the electronic device, the computing device determines context information for the electronic device. For example, the computing device may identify any of a current activity of the user of the device, a physical location of the device, a current time of day, a current day of the week, or the like. The computing device may refer to at least one of external information or other user information when determining the context information, as discussed above with respect to FIG. 7.

At 1106, the computing device sends, to the electronic device, at least one of: the context information, or recommendation information related to an item recommended for access on the electronic device based at least in part on the context information. For example, the context information may be sent to the electronic device and the electronic device may use the context information to identify one or more icons to present in a particular area of a user interface designated for presenting icons that are relevant to the current context.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
under control of one or more processors configured with executable instructions,
receiving context-indicative information, the context-indicative information including at least one of:
sensor information from a sensor of an electronic device, or
time information;
based at least in part on the context-indicative information, determining a context of the electronic device;
determining a plurality of items based at least in part on the context-indicative information and an application type associated with at least a first item of the plurality of items, the application type being specified in metadata of the first item;
selecting the first item from the plurality of items, the first item being associated with the context and being of the application type; and
presenting an icon corresponding to the first item in a user interface.

2. The method as recited in claim 1, further comprising presenting the designated icon area based at least in part on receiving an input indicating a selection of a directory representation presented in the user interface, wherein the directory representation is representative of a directory structure maintaining one or more icons.

3. The method as recited in claim 1, wherein the designated icon area is a first designated icon area of the user interface and the item is a first item, the method further comprising:
presenting, in a second designated icon area of the user interface, an icon of a second item from a network-accessible catalog, wherein the second item is determined to be related to the context.

4. The method as recited in claim 1, wherein the determining the context of the electronic device further comprises determining at least one of:
a physical location of the electronic device;
a time of day;
a day of a week;
a date of a year; or
an activity of a user of the electronic device.

5. A method comprising:
under control of one or more processors configured with executable instructions,
presenting a plurality of icons in an interface;
determining context information of the device based at least in part on at least one of sensor information or time information;
determining a first item of a first plurality of items based at least in part on the context information and previously determined context information associated with a category related to the first item;
presenting a first icon corresponding to the first item in a particular area of the interface based at least in part on determining a duration over which the first item was accessed in a context associated with the previously determined context information;
determining a search keyword based at least in part on the context information of the device;
submitting a query to search a catalog of a second plurality of items wherein the query is based at least in part on the search keyword; and
presenting a second icon corresponding to a second item based at least in part, on the query.

6. The method as recited in claim 5, further comprising accessing the particular area by selecting a directory representation presented in the interface, wherein the directory representation is representative of a directory structure maintaining one or more of the plurality of icons.

7. The method as recited in claim 5, wherein the presenting the first icon in the particular area of the interface further comprises presenting the first icon in the particular area of the interface based at least in part on a physical location determined for an electronic device.

8. The method as recited in claim 5, wherein the presenting the first icon in the particular area of the interface further comprises presenting the first icon in the particular area of the interface based at least in part on at least one of:
   a time of day;
   a day of a week; or
   a date of a year.

9. The method as recited in claim 5, wherein the presenting the first icon in the particular area of the interface further comprises presenting the first icon in the particular area of the interfaces based at least in part on a user activity determined based on information from an electronic device.

10. The method as recited in claim 9, further comprising determining the user activity based at least in part on sensor information from at least one sensor comprising at least one of:
   a GPS device;
   an accelerometer;
   a compass;
   a microphone;
   a communication interface;
   a camera;
   a pressure sensor;
   an ambient light sensor;
   a proximity sensor; or
   a gyroscope.

11. The method as recited in claim 5, further comprising:
   receiving a selection of the second icon corresponding to the second item; and
   presenting information about the second item based at least in part on the selection.

12. The method as recited in claim 5, further comprising:
   accessing information received from one or more other users with which the user is affiliated to determine a recommended item that is related to the context information; and
   presenting an icon of the recommended item in the designated area or in another designated area.

13. The method as recited in claim 12, wherein the accessing information received from one or more other users with which the user is affiliated further comprises obtaining the information through at least one of:
   a social network site;
   a microblog site; or
   a contact list.

14. The method as recited in claim 5, wherein the plurality of items comprises at least one of:
   an application accessible on an electronic device; or
   a content item accessible on the electronic device.

15. The method as recited in claim 5, further comprising:
   determining that the first item corresponding to the first icon has not been accessed on an electronic device within an amount of time; and
   wherein the particular area of the interface is for presenting icons of items recommended for deletion from the electronic device.

16. The method as recited in claim 5, wherein:
   the items are classified into a plurality of different categories based on a type of each item; and
   the method further comprising selecting the icon in response to a user input instructing presentation of one or more icons corresponding to one or more respective items in a particular category.

17. The method as recited in claim 5, further comprising selecting the icon based at least in part on a user input instructing a sorting arrangement to be applied based at least in part on at least one of usage frequency, time or location.

18. An electronic device comprising:
   one or more processors;
   one or more computer-readable media; and
   one or more modules maintained on the one or more computer-readable media and executed by the one or more processors to perform acts comprising:
      determining context information for the electronic device;
      identifying an application type related to the context information based at least in part on the context information and an access history, wherein the access history indicates that at least a first item of a plurality of items has been accessed on the electronic device in relation to previously determined context information; and
      presenting an icon corresponding to the first item associated with the identified application type in a designated icon area based at least in part on determining a duration over which the first item associated with the application type has been accessed in a context associated with the previously determined context information, the first item having metadata indicating the application type.

19. The electronic device as recited in claim 18, wherein:
   the designated icon area is a first designated icon area; and
   the multiple icon areas include a second designated icon area for receiving an icon of a recommended item identified based on the context information, wherein the recommended item is identified based at least in part on a query sent to a network-accessible catalog based on the context information.

20. The electronic device as recited in claim 18, wherein the determining the context information of the electronic device includes determining an indication of a physical location of the electronic device.

21. The electronic device as recited in claim 18, wherein the determining the context information of the electronic device includes determining at least one of:
   a time of day;
   a day of a week; or
   a date of a year.

22. The electronic device as recited in claim 18, wherein the determining the context information of the electronic device includes determining an indication of a user activity determined based on input from at least one of:
   a GPS device;
   an accelerometer;
   a compass;
   a microphone;
   a communication interface;
   a camera;
   a pressure sensor;
   an ambient light sensor;
   a proximity sensor; or
   a gyroscope.

23. A system comprising:
   one or more processors;
   one or more computer readable media maintaining one or more instructions executable by the one or more processors to perform operations comprising:
      receiving, from an electronic device, context-indicative information indicating at least one of:
         a physical location of the electronic device, or
         an activity of a user of the electronic device;
      determining context information for the electronic device based at least in part on the context-indicative information and additional information received from at least one source external to the electronic device, wherein the additional information is based at least in part on other context-indicative information associated with a plurality of other electronic devices; and sending, to the electronic device, at least one of:
the context information; or
recommendation information related to an item recommended for access on the electronic device based at least in part on the context information.

24. The system as recited in claim 23, wherein the additional information is related to at least one of:
weather at the physical location of the device;
news related to the physical location of the device;
an event related to the physical location of the device;
a time of day;
a day of a week; or
a date of a year.

25. The system as recited in claim 23, the operations further comprising:
accessing a network-accessible catalog to determine, based at least in part on the context information, a recommended item in the network-accessible catalog; and the sending the recommendation information includes sending information related to the recommended item to the electronic device.

26. The system as recited in claim 23, the operations further comprising:
accessing information from one or more other users to determine, based at least in part on the context information, a recommended item that is related to the context information; and the sending the recommendation information includes sending information related to the recommended item to the electronic device.

27. The system as recited in claim 23, the operations further comprising accessing social network information to determine the recommendation information, wherein the social network information is obtained from at least one of:
a social network site;
a microblog site; or
information obtained from a group of users with which the user is affiliated.

* * * * *